United States Patent Office 3,773,833
Patented Nov. 20, 1973

3,773,833
UNSATURATED POLYAMINES
Gisela Henrici Henrici and Salvador Olivé Martin, Zolli-
kerberg, Switzerland, assignors to Monsanto Company,
St. Louis, Mo.
No Drawing. Filed June 25, 1971, Ser. No. 157,049
Claims priority, application Switzerland, July 14, 1970,
10,625/70
Int. Cl. C07c 87/20, 87/24
U.S. Cl. 260—583 H                  3 Claims

ABSTRACT OF THE DISCLOSURE

Polyamines of the formula

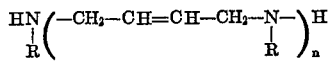

wherein R is organic of 1-24 carbon atoms and $n$ is an integer from 2 to 12. Such compounds are useful as corrosion inhibitors, halogen stabilizers, binders, adhesives and fluocculants.

---

This invention relates to polyamides of the formula

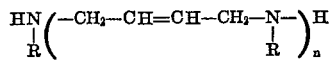

and admixtures thereof wherein R is an organic group of not more than 24 carbon atoms derived from a primary amine having in aqueous solution a dissociation constant $pK_a$ of at least 9 and $n$ is an integer of 2 to 12. More particularly the invention is concerned with polyamines soluble in ethyl alcohol.

An object of this invention is a process for the preparation of polyamines of the above formula comprising the steps (1) adding trans-1,4-dichloro-2-butene to a solution of a primary amine in a lower alcohol having 1 to 3 carbon atoms, said primary amine having 1 to 24 carbon atoms and showing in aqueous solution a dissociation constant $pK_a$ of at least 9, using a molar ratio amine/trans-1,4-dichloro-2-butene in the range of from 3:1 to 10:1; (2) keeping the solution all the time at a temperature of from about 0 to 50° C. until the chlorine atoms of the trans-1,4-dichloro-2-butene are substantially converted to chloride ions; (3) removing precipitated amine hydrochloride and/or adding and dissolving a stoichiometric amount of sodium hydroxide, based on the amount of chloride ions in solution; and (4) removing precipitated sodium chloride, if any, and the solvent to leave the product polyamine.

The action of ammonia and amines on trans-1,4-dichloro-2-butene has been described (L. H. Amundsen et al., J. Amer. Chem. Soc., 73, 2118, 1951). N,N,N',N'-tetraalkyl-2-butene-1,4-diamines were obtained when secondary amines were allowed to react with trans-1,4-dichloro-2-butene in benzene. Ammonia and trans-1,4-dichloro-2-butene reacted in water (2 phases) or in aqueous alcohol to produce very low yields of 2-butene-1,4-diamine instead of solid insoluble highly cross-linked polymer. Also the reaction with butylamine gave very low yields of the respective diamine and much tarry by-product. This reaction has been carried out in benzene, the mixture was allowed to stand for several days with periodically removing the precipitated butylamine hydrochloride, the solution was extracted with dilute hydrochloric acid, the extract was made alkaline with sodium hydroxide and the amine layer was removed, dried and distilled.

We have found now that the process of this invention on observing well defined conditions as set forth above provides excellent yields of polyamines. Since 95 to 98% of the chlorine atoms of the trans-1,4-dichloro-2-butene are replaced, it can be concluded that most end groups of the products are amino groups —N(R)H, deriving from the primary amine employed. NMR measurements show that the products are mixtures of polyamines resulting from the condensation of amine and trans-1,4-dichloro-2-butene in molar proportions of about 3:2 up to 13:12. It is further borne out by infrared spectroscopy that the double bond of the trans-1,4-dichloro-2-butene is not involved in any of the reactions which have taken place.

It is a distinctive and important feature of the instant invention that trans-1,4-dichloro-2-butene is slowly added to a relatively large excess or primary amine in alcoholic solution at relatively low temperatures. Surprisingly, neither insoluble high polymeric material nor appreciable amounts of 1,4-bis-(organoamino)-2-butene, but a very useful composition is formed, consisting essentially of low molecular weight polyamines containing about 3 to 13 amino groups in their molecules.

Suitable primary amines for practicing the invention are very numerous. They should display relatively strong basic properties as defined above. Recitation of such amines is made herein by reference to compilations dealing with dissociation constants or organic bases and presented in the technical literature, e.g., in the Handbook of Chemistry and Physics (Chemical Rubber Publishing Co., Cleveland, U.S.A.) and this publication is incorporated herein by reference.

The properties of the polyamines of this invention strongly depend on the kind of the organic group R linked to the nitrogen atom, i.e. on the primary amine employed. In general, the polyamines are soluble in ethyl alcohol and also in many other common solvents. When R is a methyl group, the polyamines up to a molecular weight of about 500 are soluble in water and chloroform. The polyamines are practically insoluble in water when R is a long group such as dodecyl, octadecyl, eicosyl and the like. On the other hand, according to the fatty character of such polyamines, they show increased solubility in hydrocarbons, especially aromatic hydrocarbons such as benzene, toluene etc., or in halogenated hydrocarbons such as chloroform, tetrachloroethane, perchloroethane etc. The water solubility or hydrophilic properties are enhanced when R is a lower alkyl bearing one or more hydroxyl groups such as 2-hydroxyethyl, 2-hydroxypropyl, 3-hydroxypropyl, hydroxy-iso-propyl, 2,3-dihydroxypropyl and the like. Those skilled in the art will recognize that the hydrocarbyl or heterocyclic group attached to the nitrogen atom of the original primary amine can bear optional inert substituents such as, for example, halogen atoms, ether groups, ester groups and tertiary amino groups, as long as the dissociation constant $pK_a$ is lying within the defined range, i.e. being at least 9.

Examples of useful primary amines include alkyl amines such as methyl amine, ethyl amine, propyl amine, butyl amine, secondary butyl amine, amyl amine, hexyl amine, heptyl amine, octyl amine, decyl amine, dodecyl amine, hexadecyl amine, and octadecyl amine and alkenyl amine such as 2-butenyl amine, 2-hexenyl amine, 2-decyl amine, 2-octadecylamine. The preferred primary amines are the alkyl amines having from 1 to 4 carbon atoms.

The reaction is carried out in a lower alcohol as solvent such as methanol, ethanol, n-propanol and iso-propanol. Gradual or slow addition of trans-1,4-dichloro-2-butene to the alcoholic solution of the primary amine means that the addition is made at such a rate that the temperature of the reaction mixture never exceeds about 50° C. and preferably remains between 0° C. and room temperature. Since the reaction is exothermic, cooling of the mixture is necessary in order to accomplish the addition within a reasonable period of time. In general, the hydrochloride of the primary amine used in the reaction is precipitated during the condensation. The conversion of the trans-1,4-dichloro-2-butene can further be observed by determination of the chloride ions in the mixture. When the reaction is complete, the hydrochloride of the starting primary amine may have precipitated partially or completely according to its solubility in the solvent employed. Any remaining chloride ions can be separated as sodium chloride upon addition of the calculated amount of sodium hydroxide. In the case of lower primary amines, for example, methylamine, ethylamine, propylamines, allylamine and butylamines which are easily volatile, the separation of the amine hydrochloride can be omitted and all chloride ions be precipitated in the form of sodium chloride. When the filtrate is freed of the solvent and of original primary amine possibly still present, a rather pure composition of polyamines is obtained. Further purification and also fractionation of the polyamines can be achieved by extraction, dissolution and reprecipitation in known manner using appropriate solvents.

The composition of polyamines can be influenced by varying the ratio amine/trans-1,4-dichloro-2-butene as exemplified below with methylamine:

TABLE I

| Amine/1, 4-D: | Conversion [1] | Molecular weight [2] | $n$ [3] |
|---|---|---|---|
| 8 | 97.5 | 290 | 3.1 |
| 4 | 98.0 | 500 | 5.7 |
| 3 | 95.0 | 630 | 7.2 |
| 2 | 60.0 | [4] | |

[1] Based on Cl.
[2] Determined by NMR measurements.
[3] Calculated from molecular weight.
[4] Insoluble polymers.

Those having ordinary skill in the art will understand that on decreasing the ratio amine/trans-1,4-dichloro-2-butene below 3, the amount of undesired high molecular weight polymers will progressively increase.

The polyamines of this invention can be used instead of well known polyamines such as diethylenetriamine, triethylenetetramine, dipropylenetriamine, tripropylenetetramine and the like. It is useful as curing agents for polyurethane foams and epoxide resins, as vulcanization accelerators, corrosion inhibitors, stabilizers for halogen-containing polymers and as textile agents. Profit can be taken in many instances of their polyfunctional linking ability, e.g., as binder in non woven fabrics. The products bearing a long straight chain alkyl group on the nitrogen atom such as dodecyl, tridecyl, tetradecyl etc. are cationic surfactants. Since the polyamines are strong bases, they are able to form water soluble salts with numerous organic and inorganic acids. Further they can undergo quaternization in known manner and reach bactericidal and fungicidal properties when the nitrogen atoms are bearing a long straight chain alkyl group as enumerated above. The polyamines of invention moreover find utilization as retention and flocculation agents in the paper manufacture. Since the terminal groups are reactive secondary amino groups, the polyamines herein described are valuable intermediates. For example, they can be brought to reaction with organic acid dichlorides, e.g., adipoyldichloride to yield interesting polymers containing tertiary amino groups as well as amido groups and being still soluble in water, alcohol and chloroform, when R is a lower alkyl group, e.g., methyl group. Such polymers may find application in the adhesive field.

EXAMPLE 1

Methylamine (49.6 g., 1.6 mols) contained in 160 ml. of oxygen-free ethyl alcohol is placed in a 500 ml. flask provided with a dropping funnel and a magnetic stirrer. Trans-1,4-dichloro-2-butene (25 g., 0.2 mol) under argon is introduced into the funnel. The apparatus is then put into an ice bath and the addition begins. It takes about 20-30 minutes. After the addition is complete, the reaction is allowed to proceed for two more hours. The ice bath is then taken off. During the first hour the solution increases its temperature slowly up to 35-40° C., because of the heat of reaction. After three hours the reaction solution is again at room temperature. It is light yellow and has a precipitate of methylamine hydrochloride. The precipitate is filtered and weighed (15.4 g., 0.23 mol). The ionic Cl⁻ remaining in the solution is titrated in order to determine the conversion of organic chlorine. The equivalent of NaOH pellets (in the present case 0.16 mol) is then added to the liquid, and the mixture is stirred for two hours. After this time the pellets have dissolved and a white precipitate of NaCl is formed amounting to 9.28 g. (0.16 mol). After filtration the liquid is distilled off in vacuo, and the residue is placed into a vacuum oven for drying.

Yield: 13.3 g. of polyamines: waxy, yellow composition.

To prepare the salt, the polyamines are dissolved in ethyl alcohol, and HCl (about 10 M) is added until a pH of about 3 is reached. 60-80% of the salt precipitates and can be separated by filtration. The homogeneous filtrate contains the lower molecular weight, ethanol soluble salts, which can be obtained by evaporation of the solvent.

TABLE II

Assignment of the NMR peaks for the polyamines and their hydrochlorides:

| | $\tau$ (p.p.m.) | |
|---|---|---|
| Group | Base (CDCl₃) | Hydrochloride (D₂O) |
| i-CH₃ | 7.8 | 7.2 |
| e-CH₃ | 7.6 | 7.3 |
| i-CH₂ | 7.0 } | 6.2 |
| e-CH₂ | 6.8 } | |
| —CH=CH— | 4.3 | 3.8 |
| NH | 8.6 | |

TABLE III

Infrared absorption bands of the polyamines and their tentative assignments:

J, cm.⁻¹:                Assignment
  965 _____ Trans-double bond.
  2795 _____ N-methyl.
  1560 _____ —NH— bending.
  1125 _____ —CH— stretching.

EXAMPLE 2

Polyamine (3 g., 0.01 mol) of a molecular weight of about 300 is dissolved in 50 ml. of oxygen-free water containing NaOH (0.8 g., 0.02 mol) and placed in a 250 ml. flask provided with a dropping funnel and a stirrer. Under argon adipoyldichloride (2.1 g., 0.01 mol) in 20 ml. of benzene is introduced into the funnel. The apparatus is then put into an ice bath and the addition begins. It takes 20-30 minutes. After the addition is complete the reaction is allowed to proceed for three hours. The benzene phase is then separated and the transparent water phase is allowed to evaporate. After drying, the remaining polymer is extracted with chloroform and the solvent evaporated. Yield: about 4 g. waxy brown solid, showing clearly an absorption band at 1650 cm.⁻¹, demonstrating the presence of

groups.

The embodiments of this invention in which a particular property or privilege is claimed are defined as follows:

1. Polyamines of the formula

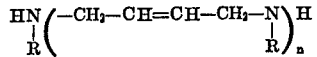

wherein R is an alkyl group containing 1 to 12 carbon atoms derived from a primary amine having in aqueous solution a dissociation constant $pK_a$ of at least 9 and $n$ is an integer of 2 to 12.

2. Polyamine of claim 1 wherein R is an alkyl group containing 1 to 4 carbon atoms.

3. Polyamine of claim 2 wherein R is methyl.

References Cited

UNITED STATES PATENTS 3,281,470   10/1966   Vertnik _____ 260—583 P

FOREIGN PATENTS 1,164,041   9/1969   Great Britain _____ 260—583 H

OTHER REFERENCES

Amundsen et al.: Journal of the American Chemical Society, vol. 73 (1951), pp. 2118–2121.

LEWIS GOTTS, Primary Examiner

R. L. RAYMOND, Assistant Examiner

U.S. Cl. X.R.

260—584 R